(12) United States Patent
Wang et al.

(10) Patent No.: US 11,906,852 B2
(45) Date of Patent: Feb. 20, 2024

(54) LIQUID CRYSTAL ON SILICON PANEL WITH ELECTRICALLY-CONDUCTIVE ADHESIVE

(71) Applicant: Lumentum Operations LLC, San Jose, CA (US)

(72) Inventors: Edward Wang, Ottawa (CA); Wenlin Jin, Ottawa (CA); Chi-li-ma Harnold, Sugar Land, TX (US)

(73) Assignee: Lumentum Operations LLC, San Jose, CA (US)

( * ) Notice: Subject to any disclaimer, the term of this patent is extended or adjusted under 35 U.S.C. 154(b) by 0 days.

(21) Appl. No.: 17/810,080

(22) Filed: Jun. 30, 2022

(65) Prior Publication Data
US 2023/0296941 A1 Sep. 21, 2023

Related U.S. Application Data

(60) Provisional application No. 63/269,429, filed on Mar. 16, 2022.

(51) Int. Cl.
*G02F 1/1339* (2006.01)
*G02F 1/1362* (2006.01)
(Continued)

(52) U.S. Cl.
CPC ........ *G02F 1/13392* (2013.01); *G02F 1/1337* (2013.01); *G02F 1/134309* (2013.01);
(Continued)

(58) Field of Classification Search
CPC .. G02F 1/1337; G02F 1/1339; G02F 1/13392; G02F 1/13396; G02F 1/1345; G02F 1/13452; G02F 1/13454; G02F 1/13456; G02F 1/13458; G02F 2202/16; G02F 2202/28

See application file for complete search history.

(56) References Cited

U.S. PATENT DOCUMENTS

| 2013/0010240 A1* | 1/2013 | Moriwaki | G02F 1/1339 445/25 |
| 2013/0077030 A1* | 3/2013 | Wang | C09J 9/02 977/734 |

(Continued)

*Primary Examiner* — Jessica M Merlin
(74) *Attorney, Agent, or Firm* — Harrity & Harrity, LLP

(57) ABSTRACT

In some implementations, a liquid crystal on silicon panel includes a backplane with an electrical contact formed on the backplane, a first alignment layer disposed on the backplane and interfacing with the electrical contact, a conductive layer that is light transmissive, a second alignment layer disposed on the conductive layer, and a plurality of beads in an electrically-conductive adhesive between the first alignment layer and the second alignment layer. Electrically-conductive particles within the electrically-conductive adhesive may make the electrically-conductive adhesive electrically-conductive. A first set of the electrically-conductive particles may puncture the first alignment layer to contact the electrical contact, and a second set of the electrically-conductive particles may puncture the second alignment layer to contact the conductive layer. An electrical connection of the electrical contact and the conductive layer may be via a plurality of the electrically-conductive particles.

20 Claims, 3 Drawing Sheets

(51) Int. Cl.
*G02F 1/1343* (2006.01)
*G02F 1/1337* (2006.01)

(52) U.S. Cl.
CPC .... *G02F 1/136277* (2013.01); *G02F 2202/16* (2013.01); *G02F 2202/28* (2013.01); *G02F 2202/36* (2013.01)

(56) References Cited

U.S. PATENT DOCUMENTS

| | | | | |
|---|---|---|---|---|
| 2013/0335940 | A1* | 12/2013 | Matsui | H05K 1/18 361/783 |
| 2014/0085579 | A1* | 3/2014 | Fan | G02F 1/1337 349/122 |
| 2014/0335290 | A1* | 11/2014 | Zhang | G02F 1/1339 252/511 |
| 2016/0077399 | A1* | 3/2016 | Tonar | G02F 1/1339 359/245 |

* cited by examiner

LIQUID CRYSTAL ON SILICON PANEL WITH ELECTRICALLY-CONDUCTIVE ADHESIVE

CROSS-REFERENCE TO RELATED APPLICATION

This Patent Application claims priority to U.S. Provisional Patent Application No. 63/269,429, filed on Mar. 16, 2022, and entitled "CONDUCTIVE EPOXY FOR LIQUID CRYSTAL ON SILICON INTERNAL CONNECTION WITH COMPRESSIBLE BEADS." The disclosure of the prior Application is considered part of and is incorporated by reference into this Patent Application.

TECHNICAL FIELD

The present disclosure relates generally to liquid crystal on silicon (LCOS) panels and to an LCOS panel with electrically-conductive adhesive.

BACKGROUND

LCOS panels are optical, active-matrix devices. LCOS panels contain a liquid crystal fluid between a backplane and a transparent cover. Pixel electrodes on the backplane (e.g., which may be reflective), and a conductive layer of the cover, segment and control electric fields or potential in different cells of the liquid crystal. Controlling electrical signals to the pixel electrodes actively controls the orientation of the particles in the liquid crystal fluid in each cell, thereby controlling the refractive index in each cell which in turn affects properties (e.g., phase shift, time delay, and interference patterns) of light in an LCOS panel. LCOS panels have myriad uses, such as for projection displays, wavelength selective switches, phased arrays, optical switching engines, structured illumination, near-eye displays, and optical pulse shaping, among other examples.

SUMMARY

In some implementations, an LCOS panel includes a first portion including a backplane with an electrical contact and a plurality of pixel electrodes formed in the backplane, and a first alignment layer disposed on the backplane and interfacing with the electrical contact. The LCOS panel may include a second portion including a conductive layer that is light transmissive, and a second alignment layer disposed on the conductive layer. The LCOS panel may include a plurality of spacer beads in a non-electrically-conductive adhesive. The non-electrically conductive adhesive may form a wall between the first portion and the second portion, and the plurality of spacer beads may define a gap between the first portion and the second portion. The LCOS panel may include a liquid crystal fluid inside of the wall between the first portion and the second portion and surrounded by the wall. The plurality of pixel electrodes may be aligned with the liquid crystal fluid. The LCOS panel may include a plurality of beads in an electrically-conductive adhesive between the first portion and the second portion outside of the wall. The electrical contact may be aligned with the plurality of beads. The electrically-conductive particles within the electrically-conductive adhesive may make the electrically-conductive adhesive electrically-conductive. Sizes of the electrically-conductive particles may be smaller than sizes of the plurality of beads. A first set of the electrically-conductive particles, aligned with one or more of the plurality of beads, may puncture the first alignment layer to contact the electrical contact and a second set of the electrically-conductive particles, aligned with one or more of the plurality of beads, may puncture the second alignment layer to contact the conductive layer. An electrical connection of the electrical contact and the conductive layer may be via a plurality of the electrically-conductive particles.

In some implementations, a method includes applying an adhesive carrier having a plurality of beads and electrically-conductive particles on at least one of a first alignment layer or a second alignment layer of an LCOS panel. The first alignment layer may be disposed on a backplane, of a first portion of the LCOS panel, that includes an electrical contact and a plurality of pixel electrodes. The second alignment layer may be disposed on a conductive layer of a second portion of the LCOS panel. Sizes of the electrically-conductive particles may be smaller than sizes of the plurality of beads. The method may include applying a plurality of spacer beads in a non-electrically-conductive adhesive in a wall on at least one of the first alignment layer or the second alignment layer. The method may include joining the first portion of the LCOS panel and the second portion of the LCOS panel so that the adhesive carrier and the plurality of spacer beads in the non-electrically-conductive adhesive are between the first alignment layer and the second alignment layer. The non-electrically-conductive adhesive may form a wall between the first portion and the second portion, and the plurality of spacer beads may define a gap between the first portion and the second portion for containing liquid crystal fluid. The method may include compressing the LCOS panel to cause a first set of the electrically-conductive particles, aligned with one or more of the plurality of beads, to puncture the first alignment layer to contact the electrical contact, and a second set of the electrically-conductive particles, aligned with one or more of the plurality of beads, to puncture the second alignment layer to contact the conductive layer, thereby establishing an electrical connection of the electrical contact and the conductive layer via a plurality of the electrically-conductive particles.

In some implementations, an LCOS panel includes a first portion including a backplane with an electrical contact and a plurality of pixel electrodes formed in the backplane, and a first alignment layer disposed on the backplane and interfacing with the electrical contact. The LCOS panel may include a second portion including a conductive layer that is light transmissive, and a second alignment layer disposed on the conductive layer. The LCOS panel may include a plurality of spacer beads in a non-electrically-conductive adhesive. The non-electrically conductive adhesive may form a wall between the first portion and the second portion, and the plurality of spacer beads may define a gap between the first portion and the second portion. The LCOS panel may include a liquid crystal fluid inside of the wall between the first portion and the second portion and surrounded by the wall. The LCOS panel may include a plurality of beads in an electrically-conductive adhesive between the first portion and the second portion outside of the wall. Electrically-conductive particles within the electrically-conductive adhesive may make the electrically-conductive adhesive electrically-conductive. Sizes of the electrically-conductive particles may be smaller than sizes of the plurality of beads. An electrical connection of the electrical contact and the conductive layer is via a plurality of the electrically-conductive particles.

DETAILED DESCRIPTION

The following detailed description of example implementations refers to the accompanying drawings. The same reference numbers in different drawings may identify the same or similar elements.

Figure 1A:
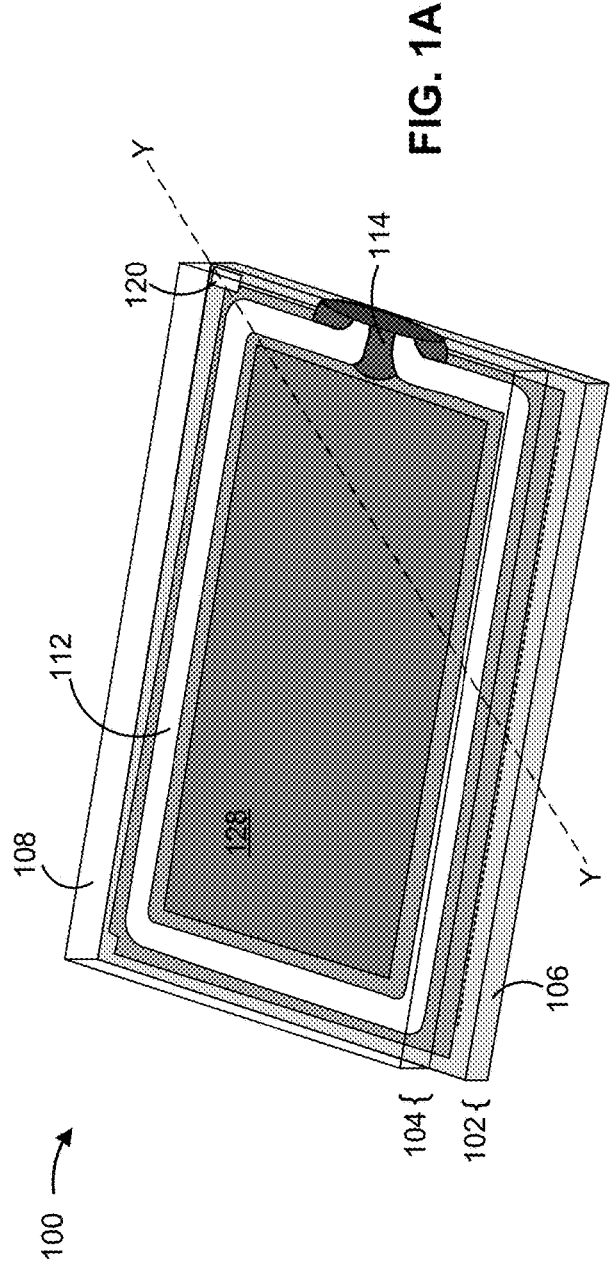
FIG. 1A is a perspective view of an example LCOS panel.
Figure 1B:
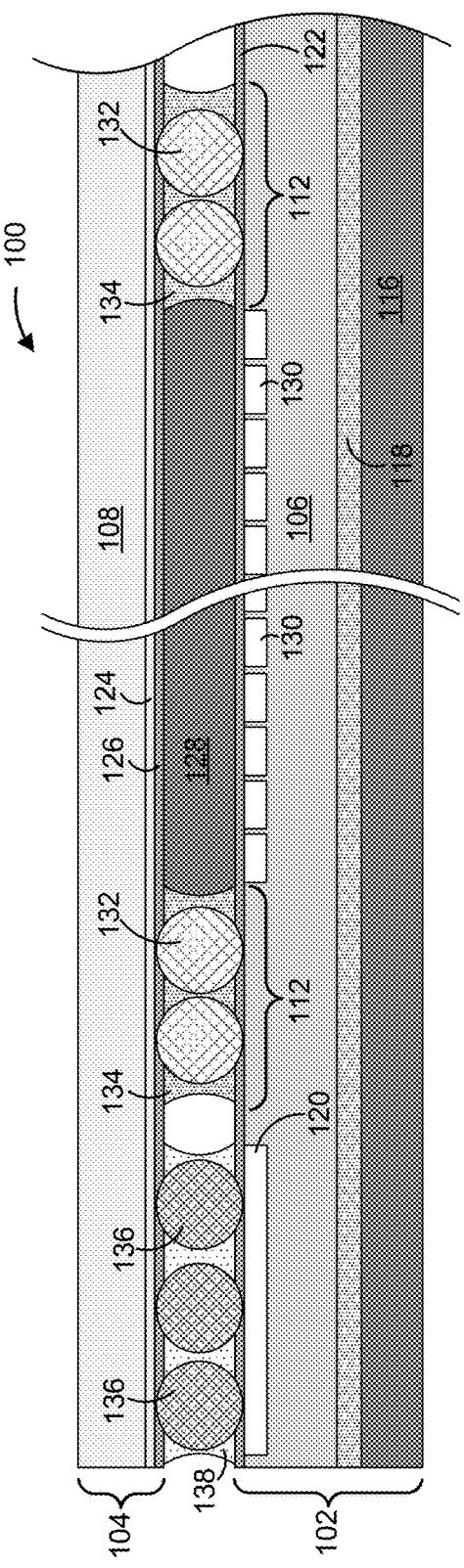
FIG. 1B is a cross-sectional view, taken along line Y-Y, of the LCOS panel of FIG. 1A.

FIG. 1A is a perspective view of an example LCOS panel 100, and FIG. 1B is a cross-sectional view, taken along line Y-Y, of the LCOS panel 100 of FIG. 1A. As shown, the LCOS panel 100 may include a first portion 102 (referred to herein as a bottom portion 102) and a second portion 104 (referred to herein as a top portion 104).

The bottom portion 102 may include a backplane 106 (e.g., a semiconductor backplane) and an LCOS carrier layer 116 (e.g., an aluminum nitride layer, or other carrier substrate) that is coupled to the backplane 106 by an adhesive layer 118 (e.g., a non-electrically-conductive epoxy layer). For example, the LCOS carrier layer 116 may be coupled to a bottom-facing surface of the backplane 106. The top portion 104 may include a top cover 108, such as a cover glass. The top cover 108 may be light transmissive (e.g., transparent). For example, the top cover 108 may be transmissive to particular operating wavelengths of light for the LCOS panel 100 (e.g., infrared, which may be used for optical communication, such as in the C band or the L band). Additionally, or alternatively, the top cover 108 may be light transmissive for other light wavelengths, such as wavelengths in the visible spectrum.

The LCOS panel 100 may include a plurality of spacer beads 132 (e.g., spherical beads) between the bottom portion 102 and the top portion 104. The spacer beads 132 may be compressible, non-electrically-conductive beads. For example, the spacer beads 132 may be polymer beads. The spacer beads 132 may be in (e.g., mixed in) a non-electrically-conductive adhesive 134 (e.g., a non-electrically-conductive epoxy adhesive). The spacer beads 132 in the non-electrically-conductive adhesive 134 may be arranged in a wall 112 between the bottom portion 102 and the top portion 104. That is, the wall 112 may be defined by the location of the spacer beads 132 in the non-electrically-conductive adhesive 134. For example, the non-electrically-conductive adhesive 134 may form the wall 112, and the spacer beads 132 may define a gap between the bottom portion 102 and the top portion 104.

During assembly of the LCOS panel 100, the bottom portion 102 and the top portion 104, with the spacer beads 132 therebetween, may be compressed toward each other. Thus, the bottom portion 102 and the top portion 104 may be compressed against the spacer beads 132, and the spacer beads 132 may halt compression of the LCOS panel 100 to define a particular sized gap between the bottom portion 102 and the top portion 104. The gap between the bottom portion 102 and the top portion 104 may be filled with a liquid crystal fluid 128 (e.g., the liquid crystal fluid is sandwiched between the bottom portion 102 and the top portion 104). Sizes of the spacer beads 132 may be tightly controlled to define a uniform separation of the bottom portion 102 and the top portion 104 and to define a precise gap that contains the liquid crystal fluid 128 at a controlled thickness (e.g., thereby providing even optical light travel distance across the liquid crystal fluid 128).

The liquid crystal fluid 128 may be inside of the wall 112. The wall 112, defined by the spacer beads 132 and the non-electrically-conductive adhesive 134, may provide containment and isolation of the liquid crystal fluid 128. For example, the wall 112 may define a sealed area (e.g., a cavity wall) between the bottom portion 102 and the top portion 104 that contains (e.g., laterally) the liquid crystal fluid 128. Moreover, the wall 112 (e.g., the non-electrically-conductive adhesive 134 in the wall 112) may adhere the bottom portion 102 and the top portion 104 together. In some examples, following assembly of the LCOS panel 100, the liquid crystal fluid 128 may be added (e.g., injected) into the gap defined by the wall 112 via a port 114, after which the port 114 may be sealed.

The bottom portion 102 may include a plurality of pixel electrodes 130, which may have light-reflective surfaces (e.g., that face the top cover 108). The pixel electrodes 130 may be formed in the backplane 106, and surrounded by the wall 112 beneath the liquid crystal fluid 128. The pixel electrodes 130 may define a pixel array (e.g., an electrically-active matrix) of the LCOS panel 100, where each pixel electrode 130 defines a pixel of the pixel array.

The top portion 104 may include a conductive layer 124. The conductive layer 124 may be light transmissive. For example, the conductive layer 124 may be transparent to the particular operating wavelengths of light for the LCOS panel 100, as described above. The conductive layer 124 may include indium-tin-oxide (ITO), or another electrically-conductive material that is light transmissive (e.g., transparent) at operating wavelengths of the LCOS panel 100 (e.g., infrared light wavelengths, such as in the C band or the L band, as described above). The conductive layer 124 may be disposed on the top cover 108. For example, the conductive layer 124 may be disposed on the bottom-facing surface of the top cover 108. A cell of the pixel array may be defined by a pixel electrode 130, a portion of the conductive layer 124 in alignment with the pixel electrode 130, and liquid crystal fluid 128 therebetween.

The conductive layer 124 may provide a common reference potential across the pixel array defined by the pixel electrodes 130. To control an orientation of particles of the liquid crystal fluid 128, electric fields may be provided through the liquid crystal fluid 128. An electric field may be generated by a potential difference between the conductive layer 124 and a pixel electrode 130. Potentials on the pixel electrodes 130 may be driven by a complementary metal-oxide-semiconductor (CMOS) integrated circuit (e.g., a CMOS decoder) of the backplane 106. Control of electrical signals to the pixel electrodes 130 controls the orientation of the particles in the liquid crystal fluid 128, and thereby controls optical properties of the liquid crystal fluid in each cell. For example, an orientation of the particles in the liquid crystal fluid 128 for a particular cell may be controlled to vary the local optical refractive index in that cell to change properties of an optical beam passing through that cell (e.g., phase shift, time delay). The collective optical effects from controlling all the individual cells may create optical interference patterns in an optical beam passing through the LCOS panel 100. By controlling individual pixels of the pixel array in this manner, the LCOS panel 100 may be manipulated to achieve light steering, or the like.

The bottom portion 102 may include a first alignment layer 122 (e.g., a dielectric layer), and the top portion 104 may include a second alignment layer 126 (e.g., a dielectric layer). The first alignment layer 122 may be disposed on the backplane 106 and may interface with the electrical contact 120. That is, the first alignment layer 122 may be disposed on the top-facing surface of the backplane 106. The second alignment layer 126 may be disposed on the conductive layer 124. For example, the second alignment layer 126 may be disposed on the bottom-facing surface of the conductive layer 124. In some implementations, the LCOS panel 100 may include both of the first alignment layer 122 and the second alignment layer 126, or may include only one of the first alignment layer 122 or the second alignment layer 126.

Each of the first alignment layer 122 and the second alignment layer 126 may include an aligning film. The aligning film may be an organic film, such as a polyimide film, or an inorganic film, such as silicon oxide film. The first alignment layer 122 and the second alignment layer 126 may provide alignment (e.g., pre-alignment) of particles in the liquid crystal fluid 128 so that the orientation of particles in the liquid crystal fluid 128 may be controlled from an aligned starting orientation rather than a random starting orientation.

An electrical contact 120 (e.g., at least one electrical contact 120) may be formed in the backplane 106. For example, the electrical contact 120 may be formed in the top-facing surface of the backplane 106. The conductive layer 124 may be connected to reference potential (e.g., ground) through the backplane 106 via the electrical contact 120. Thus, potential on the conductive layer 124 may be provided through an internal electrical connection of the LCOS panel 100 to the electrical contact 120.

The electrical contact 120 may be located outside of the wall 112, and the electrical contact 120 may be electrically isolated from the pixel electrodes 130. In particular, the electrical contact 120 is not directly beneath the liquid crystal fluid 128, while the pixel electrodes 130 are directly beneath the liquid crystal fluid 128. For example, the electrical contact 120 may be a sufficient distance away from the pixel electrodes 130 so as to reduce the effects of the electrical contact 120 on the electric fields in cells of the pixel electrodes 130. Thus, as described below, the electrical contact 120 may have an electrical connection to the conductive layer 124, while the pixel electrodes 130 may be separated from the conductive layer 124 by the liquid crystal fluid 128 (e.g., the pixel electrodes 130 are electrically isolated from the conductive layer 124).

The LCOS panel 100 may include a plurality of electrically-conductive beads 136 in an adhesive 138 (e.g., an epoxy adhesive), which conventionally may be non-electrically-conductive. An electrically-conductive bead 136 may include a compressible polymer bead with an electrically-conductive coating. The electrically-conductive beads 136 may be located between the bottom portion 102 and the top portion 104 in alignment with (e.g., directly above) the electrical contact 120. The electrically-conductive beads 136 may be used to establish the electrical connection (e.g., internally within the LCOS panel 100) between the electrical contact 120 of the bottom portion 102 and the conductive layer 124 of the top portion 104. The electrically-conductive beads 136 facilitate establishment of the electrical connection without disrupting the specific separation distance between the bottom portion 102 and the top portion 104 that defines the gap for containing the liquid crystal fluid 128, as described above.

During assembly of the LCOS panel 100, the bottom portion 102 and the top portion 104 may be compressed toward each other, thereby compressing the electrically-conductive beads 136. The electrically-conductive beads 136 may be of suitable size and hardness to puncture the first alignment layer 122 and the second alignment layer 126 during this compression, such that the electrically-conductive beads 136 contact the conductive layer 124 and the electrical contact 120 to establish the electrical connection between the conductive layer 124 and the electrical contact 120. Moreover, in a compressed state, the electrically-conductive beads 136 may maintain a contact pressure for continued electrical connection over time.

The spacer beads 132 may be slightly smaller than the electrically-conductive beads 136 when the electrically-conductive beads 136 are in an uncompressed state. When the bottom portion 102 and the top portion 104 are compressed toward each other, the electrically-conductive beads 136 are compressed, typically until the spacer beads 132 halt further compression. Thus, the spacer beads 132 ensure that a precise gap is maintained for the liquid crystal fluid 128, as described above, and that the compression force applied to the bottom portion 102 and the top portion 104 is distributed among the electrically-conductive beads 136 and the spacer beads 132.

A ratio between a compressed amount of the electrically-conductive beads 136 (e.g., corresponding to a size difference between the uncompressed electrically-conductive beads 136 and the spacer beads 132) and an original (uncompressed) size of the electrically-conductive beads 136 may be referred to as a "compression ratio." A sufficient compression ratio is needed to establish a reliable electrical connection between the conductive layer 124 and the electrical contact 120. Due to size variations among the electrically-conductive beads 136, some electrically-conductive beads 136 (e.g., larger beads or imperfect beads) may crack or otherwise become damaged during compression, and/or some electrically-conductive beads 136 (e.g., smaller beads) may be unable to puncture through the first alignment layer 122 and/or the second alignment layer 126, thereby impacting manufacturing yield and/or the reliability of the LCOS panel 100 (e.g., because damage to the electrically-conductive beads 136 may impact the reliability of the electrical connection between the conductive layer 124 and the electrical contact 120). Moreover, the manufacturing tolerances needed to minimize size variation among the electrically-conductive beads 136 may be burdensome. Furthermore, in addition to damage to the electrically-conductive beads 136, a high compression ratio may result in significant elastic relaxation of the electrically-conductive beads 136 over time and/or due to temperature changes, which reduces contact pressure and affects the electrical connectivity between the conductive layer 124 and the electrical contact 120, thereby impacting the reliability and the lifespan of the LCOS panel 100.

Accordingly, if the compression ratio is too high, too many electrically-conductive beads 136 may be cracked or damaged. However, if the compression ratio is too low, then too many of the electrically-conductive beads 136 may fail to puncture one or both alignment layers 122, 126 (e.g. too few may puncture either layer). As a result, in systems in which the adhesive 138 is not electrically-conductive, sufficient contact between the electrically-conductive beads 136 and the conductive layer 124 and the electrical contact 120 may not be achieved. In general, at a particular compression ratio, and due to inevitable size variations of electrically-conductive beads 136, if 10% of the electrically-conductive beads 136 sufficiently puncture both alignment layers 122, 126, then 30% or more of the electrically-conductive beads 136 may sufficiently puncture only one of the alignment layers 122, 126. However, in systems in which the adhesive 138 is not electrically-conductive, the electrical connection between the conductive layer 124 and the electrical contact 120 may not be established when an electrically-conductive bead 136 has sufficiently punctured only one of the alignment layers 122, 126.

Some implementations described herein provide an LCOS panel in which an electrically-conductive adhesive is used to facilitate an electrical connection between a conductive layer, of a top portion of the LCOS panel, and an electrical contact (e.g., for connecting the conductive layer) of a bottom portion of the LCOS panel. The electrically-conductive adhesive may include electrically-conductive particles in a non-electrically-conductive adhesive carrier. Moreover, beads of the LCOS panel, conventionally used for establishing the electrical connection between the conductive layer and the electrical contact, may be in the electrically-conductive adhesive. During an assembly of the LCOS panel, involving compression of the bottom portion and the top portion toward each other, the beads may push against the electrically-conductive particles to cause the electrically-conductive particles to puncture the alignment layers. The electrically-conductive particles may have an elongated shape and may be smaller than the beads, thereby improving puncturing of the alignment layers relative to beads alone. Accordingly, the electrically-conductive adhesive facilitates the electrical connection between the conductive layer and the electrical contact. Moreover, connections between the electrically-conductive particles may form a connection network within the electrically-conductive adhesive that provides the electrical connection between the conductive layer and the electrical contact. Additionally, or alternatively, the electrical connection of the conductive layer and the electrical contact may be provided via a combination of the electrically-conductive particles of the electrically-conductive adhesive and electrically-conductive beads mixed in the electrically-conductive adhesive.

In this way, the electrically-conductive particles may increase a rate or chance of a bead puncturing one or both of the alignment layers, and the electrically-conductive particles establish and maintain a reliable electrical connection between the electrical contact and the conductive layer even under non-ideal conditions, such as cracking of the beads, inconsistent puncturing of the alignment layers, or the like. Furthermore, use of the electrically-conductive particles enables a compression ratio of the beads to be reduced without sacrificing the reliability of the electrical connection, thereby reducing the likelihood that the beads will be damaged or that the beads will significantly relax over time and/or due to temperature changes. Accordingly, the LCOS panel described herein has improved reliability and improved lifespan, and may be associated with improved manufacturing yield. Moreover, due to the small size of the electrically-conductive particles, the electrically-conductive particles may provide the aforementioned improvements while maintaining a uniform amount of separation between the top portion and the bottom portion of the LCOS panel for the liquid crystal fluid.

As indicated above, FIGS. 1A-1B are provided as an example. Other examples may differ from what is described with regard to FIGS. 1A-1B.

Figure 2:
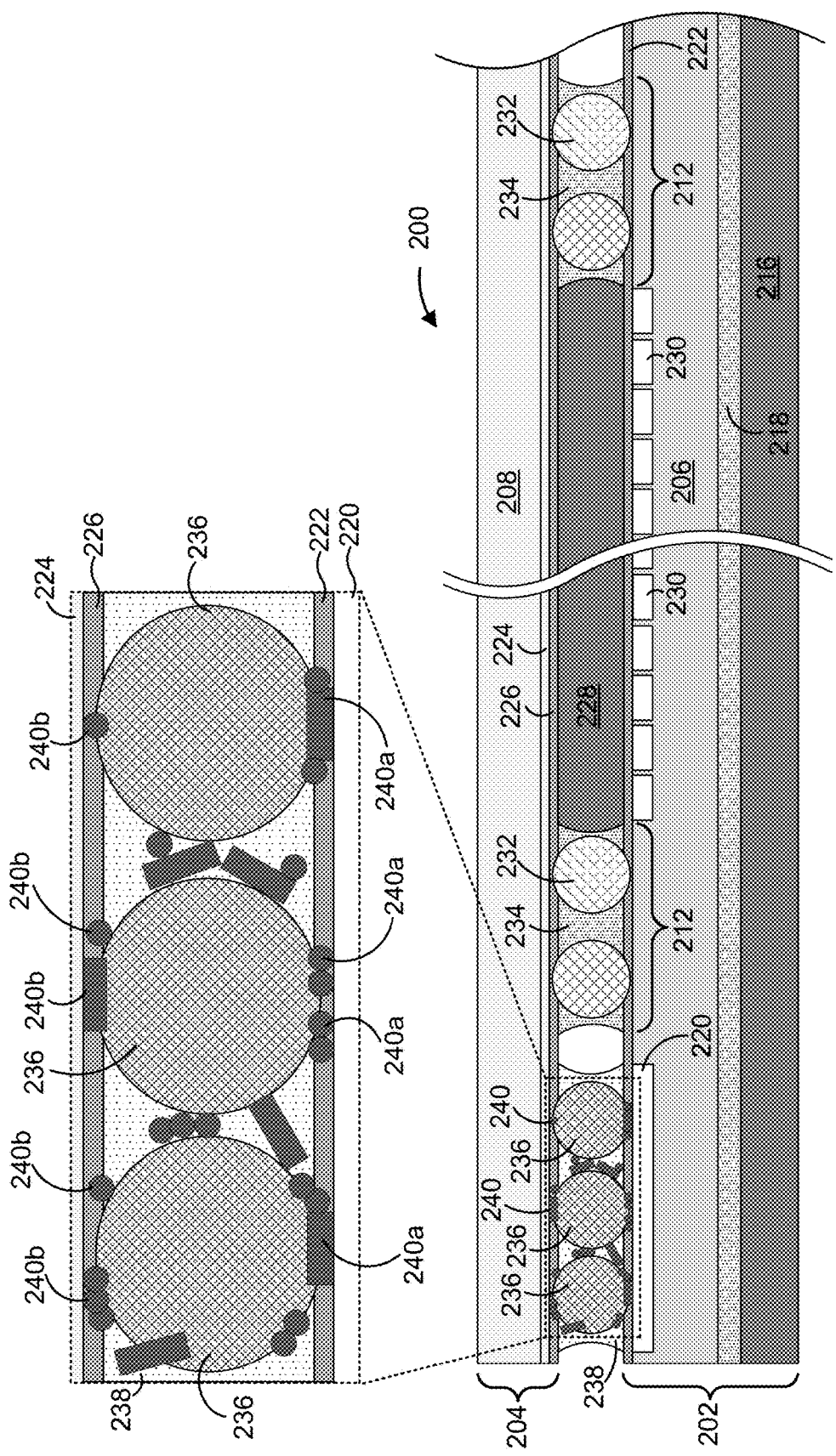
FIG. 2 is a cross-sectional view of an example LCOS panel.

FIG. 2 is a cross-sectional view of an LCOS panel 200. For example, the cross-sectional view of FIG. 2 is similar to the cross-sectional view in FIG. 1B of the LCOS panel 100 in FIG. 1A taken along line Y-Y. As shown in FIG. 2, the LCOS panel 200 may include a first portion 202 (referred to herein as a bottom portion 202) and a second portion 204 (referred to herein as a top portion 204). The bottom portion 202 may include a backplane 206 and an LCOS carrier layer 216 that is coupled to the backplane 206 by an adhesive layer 218, in a similar manner as described above. The top portion 204 may include a top cover 208, in a similar manner as described above. Between the bottom portion 202 and the top portion 204, the LCOS panel 200 may include a plurality of spacer beads 232 and a non-electrically-conductive adhesive 234 in a wall 212 that defines a gap between the bottom portion 202 and the top portion 204. The gap inside the wall 212 may be filled with liquid crystal fluid 228, in a similar manner as described above. The LCOS panel 200 may include a first alignment layer 222 of the bottom portion 202 and/or a second alignment layer 226 of the top portion 204 for the liquid crystal fluid 228, in a similar manner as described above. The LCOS panel 200 may include a plurality of pixel electrodes 230 in the backplane 206 beneath the liquid crystal fluid 228 and a conductive layer 224 disposed on the top cover 208, in a similar manner as described above. The LCOS panel 200 may include an electrical contact 220 in the backplane 206 outside of the wall 212 and electrically isolated from the pixel electrodes 230, in a similar manner as described above.

The LCOS panel 200 may include a plurality of beads 236 between the bottom portion 202 and the top portion 204 in alignment with (e.g., above) the electrical contact 220. That is, the beads 236 may be outside of the wall 212, in a similar manner as the electrically-conductive beads 136 described above. In some implementations, the beads 236 may be electrically-conductive beads. An electrically-conductive bead may include a compressible, non-electrically-conductive bead (e.g., a polymer bead) with an electrically-conductive coating (e.g., a metal coating, such as a silver coating, a gold coating, a copper coating, a nickel coating, or the like). In some implementations, the beads 236 may be non-electrically-conductive beads, similar to the spacer beads 232.

The beads 236 may be larger than the spacer beads 232 (e.g., in range from 0% (not inclusive) to 30% larger, such as in a range from 10% to 25% larger), prior to any compression of the beads 236 and the spacer beads 232. For example, diameters of the spacer beads 232 may be in a range from 1 micrometer to 30 micrometers (e.g., in a range from 10 micrometers to 15 micrometers or about 6 micrometers). The beads 236 may be compressible, so that after compression of the LCOS panel 200, an elastic force stored in the beads 236 maintains a contact pressure between the beads 236, the bottom portion 202, and the top portion 204. For example, a compression ratio of the beads 236 may be in a range from 10% to 25%, or in a range from 1% to 9%. In some implementations, a compression of the beads 236 is greater than a compression of the spacer beads 232.

The quantities and relative sizes of the spacer beads 232 and the beads 236 shown in FIG. 2 are for illustration purposes. For example, in practice, the LCOS panel 200 may include 50, 100, or more beads 236. Moreover, in practice, a lateral (e.g., horizontal) separation between the spacer beads 232 and the beads 236 may be a greater separation than what is shown in FIG. 2, to reduce interference between the electrical contact 220 and the pixel electrodes 230.

The beads 236 may be in (e.g., mixed in) an electrically-conductive adhesive 238 (e.g., an electrically-conductive epoxy adhesive, an electrically-conductive acrylate adhesive, an electrically-conductive silicone adhesive, an electrically-conductive resin, or the like). The electrically-conductive adhesive 238 may include electrically-conductive particles 240 in (e.g., suspended in) a non-electrically-conductive adhesive carrier (e.g., an epoxy carrier, an acrylate carrier, a silicone carrier, a resin carrier, or the like). That is, the electrically-conductive particles 240 may make the electrically-conductive adhesive 238 electrically-conductive. Shapes of the electrically-conductive particles 240 may be cubes, cuboids, cylinders, ellipsoids, rods (e.g., cylindrical rods, rectangular rods, or the like), another elongated shape, or a combination thereof. In some implementations, shapes of the electrically-conductive particles 240 may promote stacking of the electrically-conductive particles 240. The electrically-conductive particles 240 may be uniformly shaped and sized (e.g., within a tolerance, such as ±2%, ±5%, or ±10%). Alternatively, the electrically-conductive particles 240 may be non-uniformly shaped and/or sized.

The electrically-conductive particles 240 may be nanoparticles (e.g., particles no more than 100 nanometers (nm) in diameter), larger particles (e.g., particles greater than 100 nm in diameter), or the like. In some implementations, the electrically-conductive particles 240 may be graphene nanotubes, metal particles (e.g., silver particles, gold particles, copper particles, nickel particles, or the like), elongated metal particles, or the like. In some implementations, at least one dimension (e.g., height, width, diameter, or the like), such as the smaller dimension (e.g., diameter), of an electrically-conductive particle 240 may equal or exceed the respective thicknesses of the alignment layers 222, 226 (e.g., each of the alignment layers 222, 226 may have a thickness of 20 nm). For example, the smaller dimension of an electrically-conductive particle 240 may be in a range from 50 nm to 200 nm, such as 100 nm. Moreover, a size of an electrically-conductive particle 240 may be smaller than a size of a bead 236, thereby improving the penetrability of the electrically-conductive particles 240 through the alignment layers 222, 226 relative to the beads 236. For example, the smaller dimension of an electrically-conductive particle 240 may be 10 to 100 times smaller than a diameter of a bead 236. Due to the smallness of the electrically-conductive particles 240 relative to the beads 236, the electrically-conductive particles 240 have a negligible impact on the separation between the bottom portion 202 and the top portion 204 provided by the spacer beads 232 (e.g., a size of the electrically-conductive particles 240 is equal to or less than a manufacturing tolerance for the spacer beads 232). In this way, the electrically-conductive particles 240 may not significantly affect the uniformity of separation between the top portion and the bottom portion of the LCOS panel for the liquid crystal fluid 228.

A density of the electrically-conductive particles 240 in the electrically-conductive adhesive 238 may be sufficient to achieve cross-link conductivity between the electrically-conductive particles 240, as described below. For example, the electrically-conductive particles 240 may be present in the electrically-conductive adhesive 238 in a range from 10% to 60% by volume. A hardness of the electrically-conductive particles 240 may exceed respective hardnesses of the alignment layers 222, 226, thereby facilitating puncturing of the alignment layers 222, 226 by the electrically-conductive particles 240. Moreover, the hardness of the electrically-conductive particles 240 (e.g., a minimum or an average hardness across the electrically-conductive particles 240) may exceed a hardness of the beads 236 (e.g., a maximum or an average hardness across the beads 236), which may have a hardness that is constrained in order to maintain compressibility of the beads 236. For example, the electrically-conductive particles 240 may have an elastic modulus that is greater than or equal to 50 gigapascals (GPa), while the beads 236 may have an elastic modulus in a range from 2 GPa to 5 GPa.

The size, shape, and density of the electrically-conductive particles 240 shown in FIG. 2 are for illustration purposes. In practice, the electrically-conductive particles 240 may have a different size, shape, and/or density than what is shown in FIG. 2. For example, the electrically-conductive particles 240 may be smaller relative to the beads 236 than what is shown in FIG. 2, and the electrically-conductive particles 240 may have a greater density in the electrically-conductive adhesive 238 than what is shown in FIG. 2.

As described herein, the beads 236 in the electrically-conductive adhesive 238 may be co-located with (e.g., aligned with) the electrical contact 220 and the conductive layer 224 (e.g., aligned vertically through the LCOS panel 200) to enable the electrically-conductive adhesive 238 (e.g., via the electrically-conductive particles 240) to provide an electrical connection between the electrical contact 220 and the conductive layer 224. Moreover, the beads 236 in the electrically-conductive adhesive 238 may be located outside of the wall 212 (e.g., the electrical connection established via the electrically-conductive adhesive 238 may be distinct from the electrical signals for driving the pixel electrodes 230).

During assembly of the LCOS panel 200, compression of the bottom portion 202 and the top portion 204 toward each other may cause electrically-conductive particles 240 that are aligned with (e.g., trapped between) tops or bottoms of the beads 236 and the top portion 204 or bottom portion 202, respectively, to puncture the alignment layers 222, 226. That is, the compression may cause the beads 236 to push the electrically-conductive particles 240 (e.g., only those electrically-conductive particles 240 that are aligned with tops or bottoms of the beads 236) through a respective alignment layer 222, 226. Thus, the LCOS panel 200 (e.g., in a compressed state) may include a first set (e.g., one or more) of the electrically-conductive particles 240a, aligned with one or more beads 236, that puncture the first alignment layer 222 to contact the electrical contact 220, and a second set (e.g., one or more) of the electrically-conductive particles 240b, aligned with one or more beads 236, that puncture the second alignment layer 226 to contact the conductive layer 224. For example, the LCOS panel 200 may be in a compressed state such that the first set of the electrically-conductive particles 240a, puncturing the first alignment layer 222, and the second set of the electrically-conductive particles 240b, puncturing the second alignment layer 226, are pushed against one or more of the beads 236. Furthermore, the elastic force stored in the beads 236 due to compression may contribute to maintaining contact between the electrically-conductive particles 240, the electrical contact 220, and the conductive layer 224.

An electrical connection of the electrical contact 220 and the conductive layer 224 (e.g., an electrical connection internally within the LCOS panel 200) may be established via the electrically-conductive particles 240 (e.g., to connect the conductive layer 224). As described above, the electrical connection established via the electrically-conductive particles 240 may be distinct from the electrical signals for driving the pixel electrodes 230. For example, the electrical connection may provide a reference potential at the conductive layer 224.

Connections between the electrically-conductive particles 240 may form a connection network within the electrically-conductive adhesive 238 that provides the electrical connection between the electrical contact 220 and the conductive layer 224. In particular, the connection network may include electrically-conductive particles 240 that do not puncture either of the alignment layers 222, 226, but that are located between the alignment layers 222, 226 in a manner that achieves cross-link conductivity from one or more electrically-conductive particles 240a of the first set and one or more electrically-conductive particles 240b of the second set. In this way, the electrical connection between the electrical contact 120 and the conductive layer 124 is made regardless of whether of the beads 236 are electrically-conductive beads or non-electrically-conductive beads.

In addition, when the beads 236 are electrically-conductive beads, an electrical connection of the electrical contact 220 and the conductive layer 224 may be established via a combination of the electrically-conductive particles 240 and the beads 236. For example, the electrical connection may include a connection between the first set of the electrically-conductive particles 240a and one or more of the beads 236, and a connection between the one or more beads 236 and the second set of the electrically-conductive particles 240b. Some electrically-conductive beads 236 of the beads 236 may have electrically-conductive particles 240 that puncture the top, second alignment layer 226 and electrically-conductive particles 240 that puncture the bottom, first alignment layer 222 enabling an electrical connection between the electrical contact 220 and the conductive layer 224 vertically, or directly, through those electrically-conductive beads 236 and their associated electrically-conductive particles 240. However, for those beads 236 which do not have particles piercing both alignment layers 222, 226, an electrical connection can still be established laterally, or indirectly, through the electrically-conductive adhesive 238 between some beads 236 with electrically-conductive particles 240 piercing the top, second alignment layer 226 and other beads 236 with electrically-conductive particles 240 piercing the bottom, first alignment layer 222. Thus, an electrically-conductive bead 236 may contribute to the electrical connection even if the bead 236 has penetrated only one of the alignment layers 222, 226 or neither of the alignment layers 222, 226 because of the electrically-conductive adhesive 238.

In this way, the electrically-conductive particles 240 may establish and maintain a reliable electrical connection between the electrical contact 220 and the conductive layer 224 even under non-ideal conditions, such as cracking of the beads 236, inconsistent puncturing of the alignment layers 222, 226, or the like. Furthermore, use of the electrically-conductive particles 240 enables a compression ratio of the beads 236 to be reduced without sacrificing the reliability of the electrical connection, thereby reducing the likelihood that the beads 236 will be damaged or that the beads 236 will significantly relax over time and/or due to temperature changes. Accordingly, the LCOS panel 200 has improved reliability and improved lifespan, and may be associated with improved manufacturing yield.

In some implementations, another type of LCOS panel device or optical device (e.g., a liquid crystal-based optical device) may utilize the techniques and structures described herein. For example, an LCOS panel device or optical device, that includes a liquid crystal fluid between one or more alignment layers (e.g., that is confined by a wall, as described herein) disposed on a bottom electrical contact/layer and a top conductive layer may include the beads 236 in the electrically-conductive adhesive 238, described herein, to establish an internal electrical connection between the bottom electrical contact/layer and the top conductive layer.

As indicated above, FIG. 2 is provided as an example. Other examples may differ from what is described with regard to FIG. 2.

Figure 3:
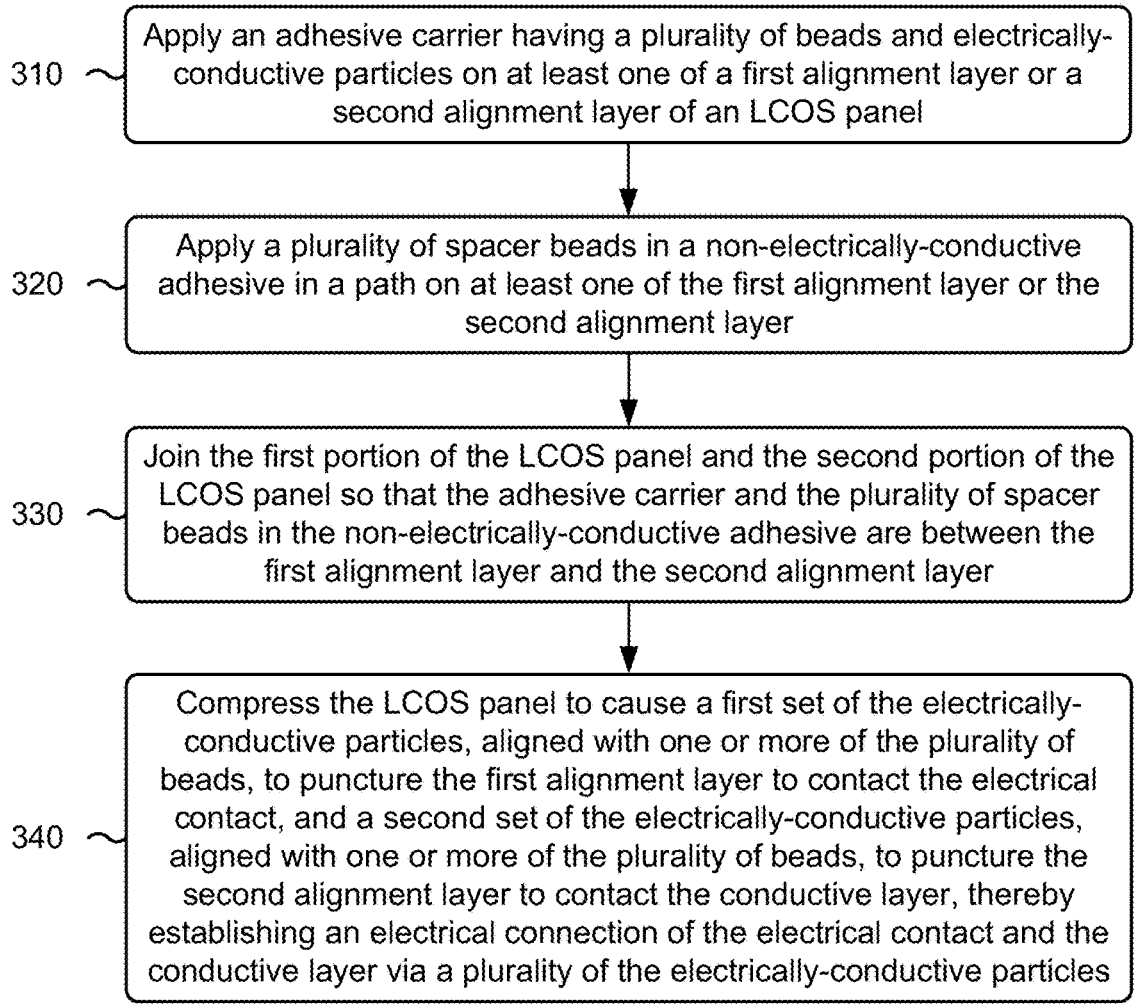
FIG. 3 is a flowchart of an example process relating to manufacturing an LCOS panel.

FIG. 3 is a flowchart of an example process 300 relating to manufacturing an LCOS panel. In some implementations, one or more process blocks of FIG. 3 are performed by a machine.

As shown in FIG. 3, process 300 may include applying an adhesive carrier having a plurality of beads and electrically-conductive particles on at least one of a first alignment layer or a second alignment layer of an LCOS panel (block 310). The LCOS panel may be configured as described in connection with FIG. 2. For example, the first alignment layer may be disposed on a backplane, of a first portion of the LCOS panel, that includes an electrical contact and a plurality of pixel electrodes, and the second alignment layer may be disposed on a conductive layer of a second portion of the LCOS panel. In some implementations, sizes of the electrically-conductive particles are smaller than sizes of the plurality of beads.

As further shown in FIG. 3, process 300 may include applying a plurality of spacer beads in a non-electrically-conductive adhesive in a wall on at least one of the first alignment layer or the second alignment layer (block 320).

As further shown in FIG. 3, process 300 may include joining the first portion of the LCOS panel and the second portion of the LCOS panel so that the adhesive carrier and the plurality of spacer beads in the non-electrically-conductive adhesive are between the first alignment layer and the second alignment layer (block 330). The non-electrically-conductive adhesive may form a wall between the first portion and the second portion, and the plurality of spacer beads may define a gap between the first portion and the second portion for containing liquid crystal fluid (e.g., once the first portion and the second portion are joined).

As further shown in FIG. 3, process 300 may include compressing the LCOS panel to cause a first set of the electrically-conductive particles, aligned with one or more of the plurality of beads, to puncture the first alignment layer to contact the electrical contact, and a second set of the electrically-conductive particles, aligned with one or more of the plurality of beads, to puncture the second alignment layer to contact the conductive layer, thereby establishing an electrical connection of the electrical contact and the conductive layer via a plurality of the electrically-conductive particles (block 340). In some implementations, compressing the LCOS panel may apply a compression force to the LCOS panel that is less than a compression force that otherwise would be applied to an LCOS panel that is similar to the LCOS panel (e.g., similar to LCOS panel 200) but that does not include the electrically-conductive adhesive. In some implementations, compressing the LCOS panel may apply a compression force to the LCOS panel that is the same as a compression force that otherwise would be applied to the LCOS panel that does not include the electrically-conductive adhesive. However, here, the LCOS panel that includes the electrically-conductive adhesive may provide an improved electrical connection and reliability relative to the LCOS panel that does not include the electrically-conductive adhesive.

Process 300 may include additional implementations, such as any single implementation or any combination of implementations described below and/or in connection with one or more other processes described elsewhere herein.

In a first implementation, compressing the LCOS panel causes the first set of the electrically-conductive particles to be pushed against one or more of the plurality of beads, with which the first set of the electrically-conductive particles are aligned, to puncture the first alignment layer, and the second set of electrically-conductive particles to be pushed against one or more of the plurality of beads, with which the second set of the electrically-conductive particles are aligned, to puncture the second alignment layer. For example, electrically-conductive particles that are aligned with tops and/or bottoms of one or more beads may be trapped between the beads and one or more alignment layers, such that the electrically-conductive particles are pushed against the beads during the compression of the LCOS panel to thereby puncture the alignment layers. Moreover, as described above, a hardness, a size, and/or a shape of the electrically-conductive particles facilitate puncturing of the alignment layers during the compression.

In a second implementation, alone or in combination with the first implementation, process 300 includes adding (e.g., injecting) liquid crystal fluid inside of the wall (e.g., into the gap) following compression of the LCOS panel.

In a third implementation, alone or in combination with one or more of the first or second implementations, the plurality of beads include electrically-conductive beads and the electrical connection of the electrical contact and the conductive layer is via the plurality of the electrically-conductive particles and one or more of the electrically-conductive beads.

In a fourth implementation, alone or in combination with one or more of the first or second implementations, the plurality of beads include non-electrically-conductive beads, and the electrical connection of the electrical contact and the conductive layer is via cross link conductivity between the plurality of electrically-conductive particles.

In some implementations, compressing the LCOS panel may include compressing the LCOS panel until the spacer beads prevent further compression at a defined height for the gap between the first portion and the second portion for cells of the LCOS panel. In some implementations, the beads may be compressed sufficiently to cause trapped electrically-conductive particles to pierce through the alignment layers and establish electrical conductivity before the spacer beads prevent further compression of the LCOS panel.

Although FIG. 3 shows example blocks of process 300, in some implementations, process 300 includes additional blocks, fewer blocks, different blocks, or differently arranged blocks than those depicted in FIG. 3. Additionally, or alternatively, two or more of the blocks of process 300 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "top," "bottom," or the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A liquid crystal on silicon (LCOS) panel, comprising:
   a first portion, comprising:
      a backplane with an electrical contact and a plurality of pixel electrodes formed in the backplane; and
      a first alignment layer disposed on the backplane and interfacing with the electrical contact;
   a second portion, comprising:
      a conductive layer that is light transmissive; and
      a second alignment layer disposed on the conductive layer;
   a plurality of spacer beads in a non-electrically-conductive adhesive,
      wherein the non-electrically-conductive adhesive forms a wall between the first portion and the second portion, and the plurality of spacer beads defines a gap between the first portion and the second portion;
   a liquid crystal fluid inside of the wall between the first portion and the second portion and surrounded by the wall,
      wherein the plurality of pixel electrodes are aligned with the liquid crystal fluid; and
   a plurality of beads in an electrically-conductive adhesive between the first portion and the second portion outside of the wall,
      wherein the electrical contact is aligned with the plurality of beads,
      wherein electrically-conductive particles within the electrically-conductive adhesive make the electrically-conductive adhesive electrically-conductive,
      wherein sizes of the electrically-conductive particles are smaller than sizes of the plurality of beads, wherein a first set of the electrically-conductive particles, aligned with one or more of the plurality of beads, puncture the first alignment layer to contact the electrical contact and a second set of the electrically-conductive particles, aligned with one or more of the plurality of beads, puncture the second alignment layer to contact the conductive layer, and wherein an electrical connection of the electrical contact and the conductive layer is via a plurality of the electrically-conductive particles.

2. The LCOS panel of claim 1, wherein the plurality of beads comprise electrically-conductive beads.

3. The LCOS panel of claim 2, wherein the electrical connection of the electrical contact and the conductive layer is via the plurality of the electrically-conductive particles and one or more of the electrically-conductive beads.

4. The LCOS panel of claim 1, wherein the plurality of beads are 10% to 25% larger than the plurality of spacer beads.

5. The LCOS panel of claim 1, wherein the LCOS panel is in a compressed state such that the first set of the electrically-conductive particles, puncturing the first alignment layer, and the second set of the electrically-conductive particles, puncturing the second alignment layer, are pushed against one or more of the plurality of beads.

6. The LCOS panel of claim 1, wherein at least one dimension of an electrically-conductive particle, of the electrically-conductive particles, equals or exceeds thicknesses of the first alignment layer and the second alignment layer.

7. The LCOS panel of claim 1, wherein the electrically-conductive particles are nanoparticles.

8. The LCOS panel of claim 1, wherein the electrically-conductive particles are shaped as rods.

9. The LCOS panel of claim 1, wherein the electrically-conductive particles are graphene nanotubes.

10. A liquid crystal on silicon (LCOS) panel, comprising:
   a first portion, comprising:
      a backplane with an electrical contact and a plurality of pixel electrodes formed in the backplane; and
      a first alignment layer disposed on the backplane and interfacing with the electrical contact;
   a second portion, comprising:
      a conductive layer that is light transmissive; and
      a second alignment layer disposed on the conductive layer;
   a plurality of spacer beads in a non-electrically-conductive adhesive,
      wherein the non-electrically-conductive adhesive forms a wall between the first portion and the second portion, and the plurality of spacer beads defines a gap between the first portion and the second portion;
   a liquid crystal fluid inside of the wall between the first portion and the second portion and surrounded by the wall; and
   a plurality of beads in an electrically-conductive adhesive between the first portion and the second portion outside of the wall,
      wherein electrically-conductive particles within the electrically-conductive adhesive make the electrically-conductive adhesive electrically-conductive,
      wherein sizes of the electrically-conductive particles are smaller than sizes of the plurality of beads, and
      wherein an electrical connection of the electrical contact and the conductive layer is via sat least one of:
         a first set of the electrically-conductive particles that are in contact with both the first alignment layer and the electrical contact, or
         a second set of electrically-conductive particles that are in contact with both the second alignment layer and the conductive layer.

11. The LCOS panel of claim 10, wherein the plurality of beads comprise electrically-conductive beads.

12. The LCOS panel of claim 11, wherein the electrical connection of the electrical contact and the conductive layer is via the at least one of the first set of electrically-conductive particles or the second set plurality of the electrically-conductive particles and one or more of the electrically-conductive beads.

13. The LCOS panel of claim 10, wherein the plurality of beads are larger than the plurality of spacer beads.

14. The LCOS panel of claim 10, wherein hardnesses of the at least one of the first set of electrically-conductive particles or the second set of electrically-conductive particles are greater than hardnesses of the plurality of beads.

15. The LCOS panel of claim 10, wherein the LCOS panel is in a compressed state such that the first set of the electrically-conductive particles, puncturing the first alignment layer, and the second set of the electrically-conductive particles, puncturing the second alignment layer, are pushed against one or more of the plurality of beads.

16. The LCOS panel of claim 10, wherein a compression of the plurality of beads is greater than a compression of the plurality of spacer beads.

17. The LCOS panel of claim 10, wherein at least one dimension of an electrically-conductive particle, of the at least one of the first set of electrically-conductive particles or the second set of electrically-conductive particles, equals or exceeds thicknesses of the first alignment layer and the second alignment layer.

18. The LCOS panel of claim 10, wherein the at least one of the first set of electrically-conductive particles or the second set of electrically-conductive particles are nanoparticles.

19. The LCOS panel of claim 10, wherein the at least one of the first set of electrically-conductive particles or the second set of electrically-conductive particles are shaped as rods.

20. The LCOS panel of claim 10, wherein the at least one of the first set of electrically-conductive particles or the second set of electrically-conductive particles are graphene nanotubes.

* * * * *

UNITED STATES PATENT AND TRADEMARK OFFICE
CERTIFICATE OF CORRECTION

| | | |
|---|---|---|
| PATENT NO. | : 11,906,852 B2 | Page 1 of 1 |
| APPLICATION NO. | : 17/810080 | |
| DATED | : February 20, 2024 | |
| INVENTOR(S) | : Edward Wang, Wenlin Jin and Chi-li-ma Harnold | |

It is certified that error appears in the above-identified patent and that said Letters Patent is hereby corrected as shown below:

In the Claims

In Claim 10, Column 16, Line 7, "via sat least" should be changed to ---via at least---

In Claim 12, Column 16, Line 19, "set plurality of" should be changed to ---set of---

Signed and Sealed this
Twenty-ninth Day of October, 2024

*Katherine Kelly Vidal*

Katherine Kelly Vidal
*Director of the United States Patent and Trademark Office*